US005976487A

United States Patent [19]

Kajiwara et al.

[11] Patent Number: 5,976,487

[45] Date of Patent: Nov. 2, 1999

[54] PROCESS FOR PURIFYING AN AQUEOUS SOLUTION OF HYDROGEN PEROXIDE

[75] Inventors: Shoichiro Kajiwara; Hirokazu Serizawa; Kazunori Nagai, all of Yamakita-machi, Japan

[73] Assignee: Mitsubishi Gas Chemical Company, Inc, Tokyo, Japan

[21] Appl. No.: 09/060,369

[22] Filed: Apr. 15, 1998

[30] Foreign Application Priority Data

Apr. 24, 1997 [JP] Japan .................................... 9-107600

[51] Int. Cl.$^{6}$ .................................................... C01B 15/01

[52] U.S. Cl. ............................................................ 423/584

[58] Field of Search ............................................... 423/584

[56] References Cited

U.S. PATENT DOCUMENTS

| | | | |
|---|---|---|---|
| 3,074,782 | 1/1963 | Meeker et al. | 423/584 |
| 4,999,179 | 3/1991 | Sugihara et al. | 423/584 |
| 5,397,475 | 3/1995 | Millar et al. | 423/584 |
| 5,534,238 | 7/1996 | Kajiwara et al. | 423/584 |
| 5,733,521 | 3/1998 | Minamikawa et al. | 423/584 |

OTHER PUBLICATIONS

Webster's *New Collegiate Dictionary*, G. & C. Merriam Company, p. 22, 1979.

*Primary Examiner*—Wayne Langel
*Attorney, Agent, or Firm*—Antonelli, Terry, Stout & Kraus, LLP

[57] ABSTRACT

A process for purifying an aqueous solution of hydrogen peroxide comprising bringing the aqueous solution of hydrogen peroxide into contact with a cation exchange resin or an anion exchange resin, aging the obtained intermediately purified aqueous solution of hydrogen peroxide by standing alone for 1 hour or more, and bringing the aged aqueous solution of hydrogen peroxide into contact with an ion exchange resin of the same type.

The process provides a high purity aqueous solution of hydrogen peroxide and can advantageously be used in the field of production of semiconductors.

15 Claims, No Drawings

PROCESS FOR PURIFYING AN AQUEOUS SOLUTION OF HYDROGEN PEROXIDE

BACKGROUND OF THE INVENTION

1. Field of the Invention

The present invention relates to a process for purifying an aqueous solution of hydrogen peroxide, and more particularly to a process for purifying an aqueous solution of hydrogen peroxide which provides a high purity aqueous solution of hydrogen peroxide used in the field of production of semiconductors.

2. Description of the Related Arts

Currently, hydrogen peroxide is mainly produced by the anthraquinone process. However, aqueous solutions of hydrogen peroxide produced in accordance with this process contain various kinds of inorganic impurities. Aqueous solutions of hydrogen peroxide having a substantially practical concentration, i.e., 5 to 70% by weight, generally contain several hundreds μg/liter of inorganic impurities.

On the other hand, a very high purity, such as a concentration of residual inorganic impurities of several tenths μg/liter or less, is required for aqueous solutions of hydrogen peroxide used in the field of semiconductor production.

Heretofore, as the process for purifying an aqueous solution of hydrogen peroxide by removing contained inorganic impurities, processes comprising bringing the aqueous solution of hydrogen peroxide into contact with an ion exchange resin have been known. It has been proposed that an aqueous solution of hydrogen peroxide is purified by using a strongly acidic cation exchange resin of a hydrogen form singly, a strongly basic anion exchange resin of a bicarbonate form, a carbonate form, or a hydroxide form singly, a mixture of a strongly acidic cation exchange resin and a strongly basic anion exchange resin, or a combination of these ion exchange resins or the mixure of ion exchange resins.

When an aqueous solution of hydrogen peroxide is purified by using an ion exchange resin, it is generally advantageous that the aqueous solution of hydrogen peroxide is brought into contact with the ion exchange resin in accordance with a continuous process in which the aqueous solution of hydrogen peroxide is passed through a column packed with the ion exchange resin. To increase the purity in accordance with this process, the time of contact of the solution with the ion exchange resin is increased. Increase in the time of contact in this process means decrease in the space velocity (SV) of the aqueous solution of hydrogen peroxide passed through the column. However, it is the real situation that decrease in the space velocity does not give rise to as much improvement in the purity as expected.

SUMMARY OF THE INVENTION

An object of the present invention is to provide a process which can further increase the purity in the purification of an aqueous solution of hydrogen peroxide.

As the result of intensive studies by the present inventors, it was found that an aqueous solution of hydrogen peroxide can be purified to a higher purity than that by conventional processes of purification by bringing the aqueous solution of hydrogen peroxide into contact with an ion exchange resin, aging an obtained intermediately purified aqueous solution of hydrogen peroxide by standing alone, and bringing the aged aqueous solution into contact with an ion exchange resin of the same type. The present invention has been completed on the basis of this knowledge.

Accordingly, the present invention provides a process for purifying an aqueous solution of hydrogen peroxide comprising bringing the aqueous solution of hydrogen peroxide into contact with a cation exchange resin or an anion exchange resin, aging an obtained intermediately purified aqueous solution of hydrogen peroxide by standing alone for 1 hour or more, and bringing the aged aqueous solution of hydrogen peroxide into contact with an ion exchange resin of the same type.

DESCRIPTION OF THE PREFERRED EMBODIMENTS

The concentration of hydrogen peroxide in the aqueous solution of hydrogen peroxide used in the present invention is not particularly limited. A solution having a concentration of 5 to 60% by weight is generally used.

When a cation exchange resin is used as the ion exchange resin which is brought into contact with the aqueous solution of hydrogen peroxide, a strongly acidic cation exchange resin of a hydrogen form is used. When an anion exchange resin is used as the ion exchange resin, a strongly basic anion exchange resin of a bicarbonate form, a carbonate form, or a hydroxide form is used. The cation exchange resin and the anion exchange resin are both ion exchange resins which are based on a styrene-divinylbenzene copolymer and have a steric network structure.

It is necessary that the ion exchange resin which is brought into contact with the intermediately purified aqueous solution of hydrogen peroxide after the aging is an ion exchange resin of the same type as that of the ion exchange resin with which the raw aqueous solution of hydrogen peroxide has been brought into contact in the first step. For example, when the raw aqueous solution of hydrogen peroxide is brought into contact with a cation exchange resin of a hydrogen form in the first step, the intermediately purified aqueous solution of hydrogen peroxide must be brought into contact with a cation exchange resin of a hydrogen form after the aging. When the raw aqueous solution of hydrogen peroxide is brought into contact with an anion exchange resin of a bicarbonate form in the first step, the intermediately purified aqueous solution of hydrogen peroxide must be brought into contact with an anion exchange resin of a bicarbonate form after the aging. The resin with which the raw aqueous solution of hydrogen peroxide has been brought into contact in the first step may be used again for treating the intermediately purified aqueous solution of hydrogen peroxide after the aging.

Furthermore, the ion exchange resins used before and after the aging of the aqueous solution of hydrogen peroxide are required to contain at least one ion exchange resin of the same type. It is possible that mixtures of said ion exchange resin of the same type with ion exchange resins of other types are used before and/or after the aging.

As the method for bringing the aqueous solution of hydrogen peroxide into contact with the ion exchange resin, a method comprising continuously passing the aqueous solution of hydrogen peroxide through a column packed with the cation exchange resin or the anion exchange resin can be used.

The space velocity at which the raw aqueous solution of hydrogen peroxide or the intermediately purified solution of hydrogen peroxide is brought into contact with the ion exchange resin is not particularly limited and is preferably 5 to 400 $hr^{-1}$, more preferably 25 to 200 $hr^{-1}$. The temperature at which the raw aqueous solution of hydrogen peroxide or the intermediately purified solution of hydrogen peroxide is brought into contact with the ion exchange resin is not particularly limited and is preferably the freezing point of the solution to 50° C., more preferably 0 to 20° C.

The time of aging the intermediately purified aqueous solution of hydrogen peroxide by standing the solution alone is not limited and is 1 hour or more, preferably 1 to 5 hours. The temperature of aging the solution is not particularly limited if it is the freezing point of the solution or higher and is preferably 10° C. or higher.

Methods of purification which are conducted in combination before or after the process of the present invention is not particularly limited. For example, after the purification in accordance with the process of the present invention has been conducted, purification may be conducted in accordance with the process of the present invention using a different type of ion exchange resin. After the purification in accordance with the process of the present invention using a cation exchange resin has been conducted, purification may be conducted in accordance with the process of the present invention using an anion exchange resin. Alternatively, the process of the present invention may be used in combination with a purification process using a mixture of a cation exchange resin and an anion exchange resin in desired relative amounts, i.e., a purification process using a mixed bed.

In accordance with the process of the present invention, metal impurities, such as Al, Cr, and the like, in an aqueous solution of hydrogen peroxide can efficiently be removed, and an aqueous solution of hydrogen peroxide can be purified to a higher purity.

EXAMPLES

The present invention is described in more detail with reference to examples in the following. However, the present invention is not limited by the examples. The concentrations of metals were analyzed by ICP-MS.

Example 1

Through a column packed with 100 ml of 200C, manufactured by ORGANO Corporation, of a hydrogen form which is a strongly acidic cation exchange resin of a hydrogen form, a 31% by weight aqueous solution of hydrogen peroxide containing 100 ppb by weight of Al and 1 ppb by weight of Cr was passed at SV=50 $hr^{-1}$.

The obtained intermediately purified aqueous solution of hydrogen peroxide was left standing alone at 20° C. for 1 hour and then passed through a column packed with 25 ml of 200C, manufactured by ORGANO Corporation, of a hydrogen form at SV=200 $hr^{-1}$ to obtain a purified aqueous solution of hydrogen peroxide. The contents of Al and Cr in the purified aqueous solution of hydrogen peroxide thus obtained are shown in Table.

Examples 2

The same procedures as those conducted in Example 1 were conducted except that the intermediately purified aqueous solution of hydrogen peroxide was left standing alone for 5 hours. The contents of Al and Cr in the purified aqueous solution of hydrogen peroxide thus obtained are shown in Table.

Example 3

Through a column packed with 50 ml of IRA900, manufactured by ORGANO Corporation, of a bicarbonate form which is a strongly basic anion exchange resin of a bicarbonate form, a 31% by weight aqueous solution of hydrogen peroxide containing 3 ppb by weight of Al and 1 ppb by weight of Cr was passed at SV=200 $hr^{-1}$.

The obtained intermediately purified aqueous solution of hydrogen peroxide was left standing alone at 20° C. for 1 hour and then passed through the same column as that used above at SV=200 $hr^{-1}$ to obtain a purified aqueous solution of hydrogen peroxide. The contents of Al and Cr in the purified aqueous solution of hydrogen peroxide thus obtained are shown in Table.

Examples 4

The same procedures as those conducted in Example 3 were conducted except that the intermediately purified aqueous solution of hydrogen peroxide was left standing alone for 5 hours. The contents of Al and Cr in the purified aqueous solution of hydrogen peroxide thus obtained are shown in Table.

Comparative Example 1

Through a column packed with 125 ml of 200C, manufactured by ORGANO Corporation, of a hydrogen form which is a strongly acidic cation exchange resin of a hydrogen form, a 31% by weight aqueous solution of hydrogen peroxide containing 200 ppb by weight of Al and 1 ppb by weight of Cr was passed at SV=40 $hr^{-1}$ to obtain a purified aqueous solution of hydrogen peroxide. The contents of Al and Cr in the purified aqueous solution of hydrogen peroxide thus obtained are shown in Table.

Comparative Example 2

Through a column packed with 100 ml of IRA 900, manufactured by ORGANO Corporation, of a bicarbonate form which is a strongly basic cation exchange resin of a bicarbonate form, a 31% by weight aqueous solution of hydrogen peroxide containing 3 ppb by weight of Al and 1 ppb by weight of Cr was passed at SV=100 $hr^{-1}$ to obtain a purified aqueous solution of hydrogen peroxide. The contents of Al and Cr in the purified aqueous solution of hydrogen peroxide thus obtained are shown in Table.

Comparative Examples 3

The same procedures as those conducted in Example 1 were conducted except that the intermediately purified aqueous solution of hydrogen peroxide was left standing alone for 30 minutes. The contents of Al and Cr in the purified aqueous solution of hydrogen peroxide thus obtained are shown in Table.

TABLE

| | content of Al (ppb by wt.) | content of Cr (ppb by wt.) |
|---|---|---|
| Example 1 | 0.15 | 0.33 |
| Example 2 | 0.17 | 0.32 |
| Example 3 | 0.05 | 0.01 |
| Example 4 | 0.04 | 0.01 |
| Comparative Example 1 | 0.50 | 0.75 |
| Comparative Example 2 | 0.14 | 0.05 |
| Comparative Example 3 | 0.35 | 0.51 |

What is claimed is:

1. A process for purifying an aqueous solution of hydrogen peroxide comprising bringing the aqueous solution of hydrogen peroxide into contact with a cation exchange resin, aging an obtained intermediately purified aqueous solution of hydrogen peroxide by standing alone for 1 hour or more, and bringing the aged aqueous solution of hydrogen peroxide into contact with a cation exchange resin.

2. A process according to claim 1, wherein the cation exchange resin is a strongly acidic cation exchange resin of a hydrogen form.

3. A process according to claim 1, wherein said aging is performed for a time period in a range of 1 to 5 hours.

4. A process according to claim 3, wherein said aging is performed at a temperature of at least a freezing point of the intermediately purified aqueous solution of hydrogen peroxide.

5. A process according to claim 3, wherein said aging is performed at a temperature of at least 10° C.

6. A process according to claim 1, wherein said aging is performed at a temperature of at least a freezing point of the intermediately purified aqueous solution of hydrogen peroxide.

7. A process according to claim 1, wherein said aging is performed at a temperature of at least 10° C.

8. A process according to claim 1, wherein said aging is performed at a temperature up to 20° C.

9. A process for purifying an aqueous solution of hydrogen peroxide comprising bringing the aqueous solution of hydrogen peroxide into contact with an anion exchange resin, aging an obtained intermediately purified aqueous solution of hydrogen peroxide by standing alone for 1 hour or more at a temperature up to 20° C., and bringing the aged aqueous solution of hydrogen peroxide into contact with an anion exchange resin.

10. A process according to claim 9, wherein the anion exchange resin is at least one strongly basic anion exchange resin selected from the group consisting of strongly basic anionic exchange resins of a bicarbonate form, strongly basic anionic exchange resins of a carbonate form, and strongly basic anionic exchange resins of a hydroxide form.

11. A process according to claim 9, wherein said aging is performed for a time period in a range of 1 to 5 hours.

12. A process according to claim 11, wherein said aging is performed at a temperature of at least a freezing point of the intermediately purified aqueous solution of hydrogen peroxide.

13. A process according to claim 11, wherein said aging is performed at a temperature of at least 10° C.

14. A process according to claim 9, wherein said aging is performed at a temperature of at least a freezing point of the intermediately purified aqueous solution of hydrogen peroxide.

15. A process according to claim 9, wherein said aging is performed at a temperature of at least 10° C.

* * * * *